United States Patent

Hayashi et al.

Patent Number: 5,267,476
Date of Patent: Dec. 7, 1993

[54] STRAIN DETECTOR

[75] Inventors: Kiyoshi Hayashi; Hiromasa Ozawa, both of Hyogo, Japan

[73] Assignee: Mitsubishi Denki K.K., Tokyo, Japan

[21] Appl. No.: 757,416

[22] Filed: Sep. 10, 1991

[30] Foreign Application Priority Data

Sep. 11, 1990 [JP] Japan .................. 2-241420

[51] Int. Cl.$^5$ ................................. G01L 3/00
[52] U.S. Cl. .................. 73/862.336; 73/862.333; 73/862.335
[58] Field of Search .............. 73/862.333, 862.334, 73/862.335, 862.336, DIG. 2, 776, 779

[56] References Cited

U.S. PATENT DOCUMENTS 3,861,206  1/1975  Kawafune et al. .
4,414,855  11/1983 Iwasaki .
4,896,544  1/1990  Garshelis .................. 73/862.333
4,935,263  6/1990  Satoh et al. .

FOREIGN PATENT DOCUMENTS 59-164931  9/1984  Japan .
59-180338  10/1984 Japan .
60-260821  12/1985 Japan .
62-28413   6/1987  Japan .

OTHER PUBLICATIONS

"Development of Ni-Fe Alloy Plating for Prolonging Continuous Steel Casting Mold Life", *Technical Report,* vol. 14, No. 4 (1982), pp. 12-19.

I. Sasada et al, "Torque Transducers With Stress-Sensitive Amorphous Ribbons of Chevron-Pattern", *IEEE Transactions on Magnetics,* vol. MAG-20, No. 5, Sep. 1984, pp. 951-953.

*Primary Examiner*—Richard E. Chilcot, Jr.
*Assistant Examiner*—R. Biegel
*Attorney, Agent, or Firm*—Sughrue, Mion, Zinn, Macpeak & Seas

[57]     ABSTRACT

A strain detector includes a passive member for receiving an external force, magnetostrictive layers formed on a surface of passive member and made of a magnetic material containing nickel and at least one kind of metal sulfide produced from reaction of a metal more reactive with sulfur than nickel with sulfur as an impurity, and a detection coil provided close to an exterior of magnetostrictive layers and used for detecting variations of permeability caused by strain of the magnetostrictive layers in response to the external force.

2 Claims, 2 Drawing Sheets

STRAIN DETECTOR

BACKGROUND OF THE INVENTION

The present invention relates to a strain detector for detecting the strain of a passive member.

FIG. 4 illustrates a conventional strain detector of the sort disclosed in Japanese Patent Unexamined Publication No. Sho. 59-164931, wherein there are shown an arrangement of a passive member 1 for receiving rotating torque, magnetostrictive layers 2 made of high permeability soft magnetic material and secured to the passive member 1 in the form of a belt, the belt-like magnetostrictive layers being arranged symmetrically about the central axis at angles of ±45°, and detection coils 3 provided around the magnetostrictive layers 2, respectively.

In operation, the stress maximized on the surface of the passive member 1 is produced when rotating torque is applied thereto from the outside and the principal axis of the principal stress is in the direction of the longitudinal axis of the magnetostrictive layer 2 formed of belt-like elementary strips. Assuming the principal stress is tensile force with respect to a group of elementary strips of the magnetostrictive layer 2 in one direction, it turns into compression force with respect to a group of elementary strips of the other magnetostrictive layer 2 perpendicular to that direction. When stress is applied to magnetic material whose magnetostriction constant is not zero, the permeability generally changes. When the magnetostriction constant as a quantity representing the amount of magnetostriction quantitatively is positive, the permeability will increase if tensile force acts on it, whereas it will decrease if compression force acts on it. When the magnetostriction constant is negative, the results are reversed. The detection coil 3 detects variations of the permeability in the magnetostrictive layer 2 in proportion to the quantity of torque applied from the outside as variations of magnetic impedance and also detects the quantity of torque applied to the passive member 1 and the quantity of strain accompanied therewith. As the outputs of the detection coils 3 are opposite in polarity, a large output is made available by obtaining the difference output.

Amorphous magnetic material may conventionally be used for such a magnetostrictive layer; however, it has a shortcoming in that its magnetic characteristics are liable to change by its temperature changes because its Curie temperature is relatively low and because its crystalline structure is unstable. In the case of the strain detector described above, a plating film of nickel, permalloy or iron is subjected to heat treatment before being used for the magnetostrictive layer 2. Therefore, the magnetostrictive layer 2, which is firmly secured to the passive member, has the following features: stability in view of crystalline structure, not only mechanical but also thermal stability and resulting high reliability.

The strain detector described above employs the plating film mainly composed of nickel for the magnetostrictive layers. However, the plating film tends to easily take in impurities during the plating process and particularly a trace of sulfur are introduced from an electrodeposition stress relaxation agent and the like. Although the plating film is heat-treated to increase strain detecting sensitivity, the heat treatment allows the sulfur of the impurities to combine with nickel to form a sulfide. Moreover, the sulfide is segrated at the crystal grain boundary, which makes the plating film brittle, and when torque is applied to the passive member, very small cracks are developed in the magnetostrictive layer, which is described in, for instance, Technical document, Technical Report of Kawasaki Steel Corporation, p-12, No. 4, Vol. 14 (1982). Thus, the problem arises that a hysteresis may occur in the output characteristics of the detection coil as shown in FIG. 5.

SUMMARY OF THE INVENTION

An object of the present invention is to solve the foregoing problems and to provide a strain detector which is stable mechanically and thermally, exhibits high sensitivity and offers excellent linearity in output characteristics.

The strain detector according to the present invention comprises a passive member for receiving external force, magnetostrictive layers formed on the surface of the passive member and made of magnetic material containing nickel and more than one kind of metal sulfide produced from the reaction of metal more reactive with sulfur than nickel with sulfur as impurities, and a detection coil which is provided close to the exteriors of the magnetostrictive layers and used for detecting variations of permeability caused by the strain of the magnetostrictive layers in response to the external force. As the metal more reactive with sulfur than nickel, metals such as manganese, molybdenum, magnesium, cadmium, titanium and the like, which form a sulfide with free energy for the standard formation thereof less than free energy for the standard formation of a nickel sulfide, are used alone or in combination.

The magnetostrictive layer in the strain detector according to the present invention prevents nickel from reacting with sulfur of impurities by reacting the metal more reactive with sulfur than nickel with sulfur of impurities.

DETAILED DESCRIPTION OF THE INVENTION

Figure 1:
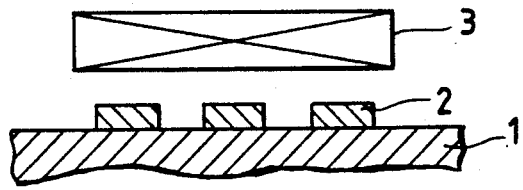
FIG. 1 is a sectional view of a principal part of a strain detector according to the present invention.

A first embodiment of the present invention will subsequently be described with reference to the accompanying drawings. FIG. 1 is a sectional view of a principal part of a strain detector embodying the present invention. In FIG. 1, there are shown a passive member 1 to which rotating torque is applied as in the case of the conventional example, magnetostrictive layers 2 formed by plating and composed of mainly nickel, iron and manganese. The remaining component parts are similar to the corresponding ones in the conventional strain detector.

A method of forming the magnetostrictive layer 2 will be first described. The surface of the passive member 1 is processed beforehand so as to increase the adhesive strength with a plating film and then the passive member 1 is soaked into a plating bath containing 16 g/l nickel sulfate, 39 g/l nickel chloride, 3 g/l ferrous sulfate, 25 g/l boric acid, 1 g/l manganous sulfate and an electrodeposition stress relaxation agent. The plating conditions include mechanically agitating the plating bath at a current density of $3A/dm^2$, PH of 2.8, and a temperature of 25° C., so that a plating film 30 $\mu$m thick is obtained on the passive member 1 for 50 minutes. Then a mask is used for photoetching the plating film so as to form a predetermined chevron pattern. The plating film thus formed contains about 89 wt % nickel, about 9 wt % iron, about 2 wt % manganese, and about 0.06 wt % sulfur as a trace of impurity. The plating film was subjected to heat treatment in a vacuum at 400° C. for one hour to obtain the magnetostrictive layer 2. As manganese selectively reacts with impurity sulfur, there exists a manganese sulfide in the magnetostrictive layer 2.

Next, a method of forming a comparative magnetostrictive layer will be described. The plating bath is composed of 16 g/l nickel sulfate, 39 g/l nickel chloride, 3 g/l ferrous sulfate, 25 g/l boric acid, and an electrodeposition stress relaxation agent. The plating conditions include mechanically agitating the plating bath at a current density of $3A/dm^2$, PH of 2.8, and a temperature of 25° C., so that a plating film 30 $\mu$m thick is obtained on the passive member for 50 minutes. The plating film thus formed contains about 90 wt % nickel, about 10 wt % iron, and about 0.06 wt % sulfur as a trace of impurity. The plating film was subjected to heat treatment in a vacuum at 400° C. for one hour to obtain the comparative magnetostrictive layer.

Figure 2:
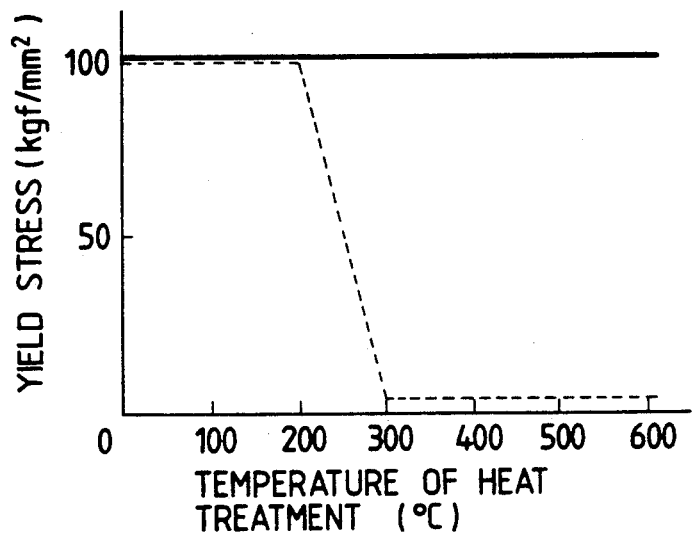
FIG. 2 is a comparative chart showing variations of yield stress of a plating film according to the present invention and a comparative plating film when they are subjected to heat treatment at various temperatures.
Figure 3:
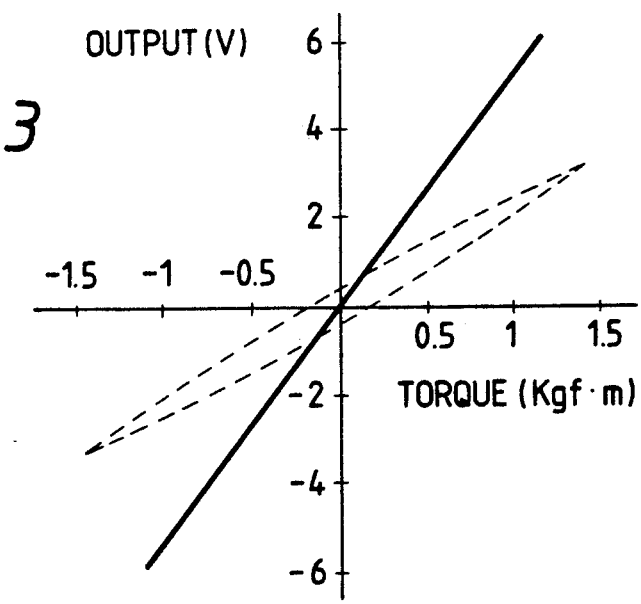
FIG. 3 is a comparative graph showing variations of the outputs of detection coils in response to the intensity of torque applied to the passive members of the strain detector according to the present invention and the comparative strain detector, respectively.
Figure 4:
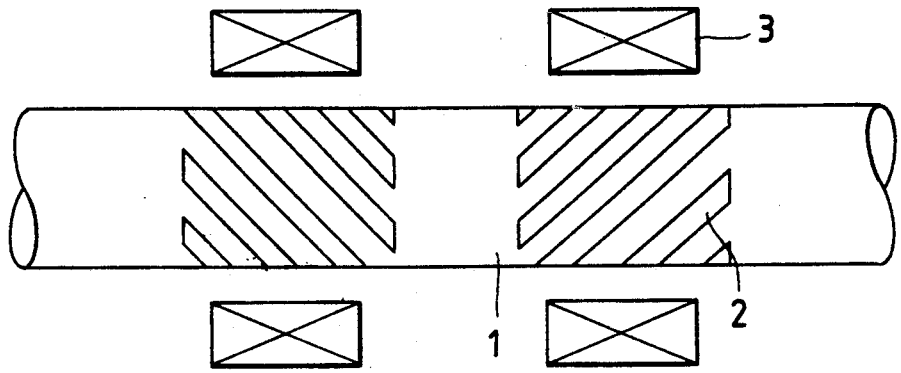
FIG. 4 is a block diagram of a conventional strain detector.
Figure 5:
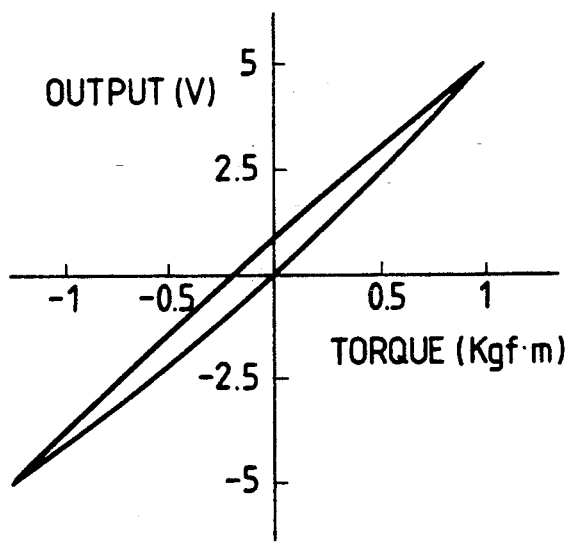
FIG. 5 is a characteristic diagram showing variations of the output of the detection coil in response to the intensity of torque applied to the passive member of the conventional strain detector.

The performance of the magnetostrictive layer and the strain detector according to the present invention will be described with reference to FIGS. 2 and 3. FIG. 2 shows variations of yield stress of plating films when they are subjected to heat treatment at various temperatures. FIG. 3 is a graph showing the relation between the intensity of rotating torque applied to the passive member 1 and the output of the detection coil 3. In FIGS. 2 and 3, continuous lines represent the results obtained from the plating film and the strain detector according to the present invention, whereas dotted lines represent those from the comparative plating film and the comparative strain detector. The comparative plating film becomes brittle with heat treatment at 200° C. or higher, thus indicating that the yield stress is extremely low. On the other hand, the plating film according to the present invention is thermally stable, irrespective of the heat treatment temperature, and exhibits the yield stress as high as about 100 kgf/mm$^2$, thus demonstrating stable mechanical characteristics. When the plating film subjected to heat treatment in a vacuum at 400° C. for one hour is used for the magnetostrictive layer, the comparative strain detector is seen to have low sensitivity and a greater hysteresis in its output characteristics, whereas the strain detector according to the present invention is seen to have high sensitivity and an excellent linearity in its output characteristics. This is because manganese functions as a getter of sulfur in the plating film during the heat treatment process for the plating film to prevent a nickel sulfide from being formed and to prevent the magnetostrictive layer from becoming brittle.

Although the magnetostrictive layer has been obtained by plating in the first embodiment, the same effect is anticipated likewise in the following second embodiment. More specifically, when such a magnetostrictive layer is formed by sticking a thin metal layer composed of mainly nickel to the passive member with an adhesive, an introduction of about 0.001 wt % sulfur into the metal layer composed of mainly nickel is unavoidable during the process of its manufacture. As a result, a nickel sulfide is formed and the magnetostrictive layer may become brittle. For instance, the magnetostrictive layer is formed as follows: A nickel-manganese alloy composed of 90 wt % nickel, 9.55 wt % iron and 0.45 wt % manganese is subjected to heat treatment in a reducing atmosphere of H2 or the like at 1,000° C. or higher to remove internal stress. Then the thin layer is joined to the passive member with an epoxy resin adhesive and the adhesive is heat-hardened under pressure before being gradually cooled. Subsequently, a mask is used for photoetching the thin metal layer to form a desired chevron pattern.

In the first and second embodiments described above, the nickel-iron-manganese alloy has been used for the magnetostrictive layer, preferred weight percents of nickel and iron for the magnetostrictive layer are ranges from 35 to 60% and from 80 to 100% for nickel. The magnetostrictive layer within those ranges has Curie temperatures as high as 350°–550° C. and becomes stable as its magnetic characteristics become less temperature-dependent. As there develops no regular lattice of Ni$_3$Fe and the like, the crystalline structure is stable and the magnetic characteristics of the magnetostrictive layer also become less temperature-dependent, so that the temperature dependence of the strain detector is improved. On the other hand, if the quantity of nickel is set in a range other than what has been described above, the permeability of the magnetostrictive layer decreases and the sensitivity of the strain detector lowers, which is undesirable. Moreover, the quantity of manganese should be large enough only to react with the whole sulfur of impurities and preferably be as small as possible.

Although manganese has been used as a sulfur getter in the magnetostrictive layer in the first and second embodiments, any metal other than nickel may be used as far as free energy for the standard formation of the metal sulfide is less than that for the nickel sulfide. Even though molybdenum, magnesium, cadmium, titanium and the like other than manganese are used alone or in combination, hardening similar to what has been described in the first and second embodiments is obtainable.

Although a case where rotating torque is applied to the passive member has been described in the first and second embodiments above, the same effect as those described in the first and second embodiments is obtained by arranging the magnetostrictive layers according to the present invention at proper positions on the passive member even when other kind of external force such as tensile force or compression force is applied.

As described above, according to the present invention, the magnetostrictive layer is made of magnetic material containing nickel and more than one kind of metal sulfide produced from the reaction of metal more reactive with sulfur than nickel with sulfur of impurities, so that the strain detector is stable mechanically and thermally, exhibits high sensitivity and offers excellent linearity in output characteristics.

What is claimed is:

1. A strain detector, comprising:
   a passive member for receiving an external force;
   magnetostrictive layers formed on a surface of said passive member and made of a magnetic material containing nickel and at least one kind of a metal sulfide produced from reaction of a metal with sulfur as an impurity, said metal being more reactive with sulfur than nickel; and
   a detection coil provided close to an exterior of said magnetostrictive layers and used for detecting variations of permeability caused by strain of said magnetostrictive layers in response to the external force, wherein the external force received by said passive member is a rotating torque.

2. A strain detector, comprising:
   a passive member for receiving an external force;
   magnetostrictive layers formed on a surface of said passive member and made of a magnetic material containing nickel and at least one kind of metal sulfide produced from reaction of a metal with sulfur as an impurity, said metal being more reactive with sulfur than nickel; and
   a detection coil provided close to an exterior of said magnetostrictive layers and used for detecting variations of permeability caused by strain of said magnetostrictive layers in response to the external force wherein the external force received by said passive member is a rotating torque, wherein said metal is one selected from a group consisting of manganese, molybdenum, magnesium, cadmium and titanium.

* * * * *